United States Patent
Guyard et al.

(10) Patent No.: US 11,131,544 B2
(45) Date of Patent: Sep. 28, 2021

(54) OPTICAL FIBRE CURVATURE SENSOR AND MEASUREMENT DEVICE COMPRISING SAID SENSOR

(71) Applicants: Université de Nantes, Nantes (FR); Centre National de la Recherche Scientifique, Paris (FR)

(72) Inventors: Romain Guyard, Nantes (FR); Yann Lecieux, Nantes (FR); Cyril Lupi, Nantes (FR); Dominique Leduc, Nantes (FR)

(73) Assignees: Université de Nantes, Nantes (FR); Centre National de la Recherche Scientifique, Paris (FR)

( * ) Notice: Subject to any disclaimer, the term of this patent is extended or adjusted under 35 U.S.C. 154(b) by 48 days.

(21) Appl. No.: 16/087,290

(22) PCT Filed: Mar. 23, 2017

(86) PCT No.: PCT/FR2017/050685
§ 371 (c)(1),
(2) Date: Oct. 17, 2019

(87) PCT Pub. No.: WO2017/162992
PCT Pub. Date: Sep. 28, 2017

(65) Prior Publication Data
US 2020/0240771 A1 Jul. 30, 2020

(30) Foreign Application Priority Data
Mar. 23, 2016 (FR) ........................................ 1652495

(51) Int. Cl.
*G01B 11/255* (2006.01)
*G01B 11/16* (2006.01)

(52) U.S. Cl.
CPC .......... *G01B 11/255* (2013.01); *G01B 11/165* (2013.01)

(58) Field of Classification Search
None
See application file for complete search history.

(56) References Cited

U.S. PATENT DOCUMENTS

| | | | |
|---|---|---|---|
| 6,511,222 B1 * | 1/2003 | Bouamra | G01K 11/32 |
| | | | 250/227.14 |
| 6,816,638 B1 * | 11/2004 | Bennion | G01B 11/18 |
| | | | 250/227.14 |

(Continued)

FOREIGN PATENT DOCUMENTS

| CN | 201382777 | 1/2010 |
|---|---|---|
| WO | WO2013131197 | 9/2013 |

OTHER PUBLICATIONS

International Search Report and Written Opinion for International Application No. PCT/FR2017/050685 dated Jun. 9, 2017.

(Continued)

*Primary Examiner* — Tina M Wong
(74) *Attorney, Agent, or Firm* — Patterson Thuente Pedersen, P.A.

(57) ABSTRACT

An optical fiber curvature sensor. Two networks (R1, R2) with periodic longitudinal modulation of the refractive index of the optical fiber core are inscribed in the fiber (F) one behind the other or one on top of the other. The networks are configured to respectively reflect wavelengths $\lambda_1$ and $\lambda_2$ such that $\lambda_1 = \lambda_B + \Delta\lambda_{B1}$ and $\lambda_2 = \lambda_B + \Delta\lambda_{B2}$, where $\lambda_B$ is the Bragg wavelength of the networks and where $\lambda_{B1}$ and $\lambda_{B2}$ are shifts sensitive to the temperature, to deformations and to the curvature of the optical fiber. The two networks are defined so that the quantities $\Delta\lambda_{B1}$ and $\Delta\lambda_{B2}$ have substan- (Continued)

tially identical sensitivity to temperature and to deformations and substantially opposite sensitivity to curvature.

10 Claims, 4 Drawing Sheets

(56) References Cited

U.S. PATENT DOCUMENTS

| | | | | |
|---|---|---|---|---|
| 8,560,048 | B2* | 10/2013 | Eberle | G01H 9/004 600/407 |
| 2003/0085344 | A1* | 5/2003 | Shu | G01K 11/32 250/227.14 |
| 2003/0086647 | A1 | 5/2003 | Willner et al. | |
| 2003/0190793 | A1* | 10/2003 | Brill | H01L 22/12 438/401 |
| 2006/0067616 | A1* | 3/2006 | Kanji | G02B 6/02085 385/37 |
| 2007/0156019 | A1 | 7/2007 | Larkin et al. | |
| 2009/0290160 | A1 | 11/2009 | Taverner | |
| 2009/0297089 | A1* | 12/2009 | Huang | G01L 9/0076 385/12 |
| 2010/0061678 | A1* | 3/2010 | Swinehart | G01K 11/3206 385/12 |
| 2010/0296080 | A1* | 11/2010 | Nishikawa | G02B 6/02085 356/128 |
| 2010/0326200 | A1* | 12/2010 | Sheverev | G01B 11/165 73/800 |
| 2011/0103743 | A1* | 5/2011 | Baets | G02B 6/34 385/37 |
| 2020/0240771 | A1* | 7/2020 | Guyard | G01B 11/165 |

OTHER PUBLICATIONS

French Search Report and Written Opinion for FR1652495 dated Nov. 14, 2016. Translation not available.

* cited by examiner

OPTICAL FIBRE CURVATURE SENSOR AND MEASUREMENT DEVICE COMPRISING SAID SENSOR

TECHNICAL FIELD

This invention relates to the field of measuring the curvature of a structure by means of an optical fiber. The invention relates more particularly to an optical fiber curvature sensor and a measuring device comprising the sensor. The invention has in particular applications in the field of energy for measuring the curvature of cables, such as submarine cables, in the field of robotics for measuring the curvature of robot arms or in the medical field for measuring the curvature of umbilical links of endoscopes.

BACKGROUND ART

A certain number of optical fiber curvature sensors are known. The sensor is placed on the element of which the radius of curvature is to be measured in such a way that the optical fiber of the sensor hugs the shape of the element. Measuring the radius of curvature then reverts to measuring the radius of curvature of the optical fiber.

Certain optical fiber sensors are based on the creating of a fault zone in the optical fiber generally obtained by polishing the sheath. This zone induces losses in intensity when it is curved, losses which depend on the radius of curvature. Determining losses then makes it possible to determine the radius of curvature of the optical fiber.

Another technique consists in measuring intermodal interferences taking advantage of the sensitivity of cladding modes to the curvature. This technique however requires complex architectures, namely a micro-structured fiber inscribed in a drawn zone welded between two optical fibers.

Finally, other methods are based on the use of fiber index gratings such as a Bragg grating or a long period grating. These two types of gratings are gratings inscribed in the optical fiber. They differ by their pitch which is of a few hundred nanometres for a Bragg grating and of a few tens or even a few hundred micrometres for a long period grating.

Figure 1:
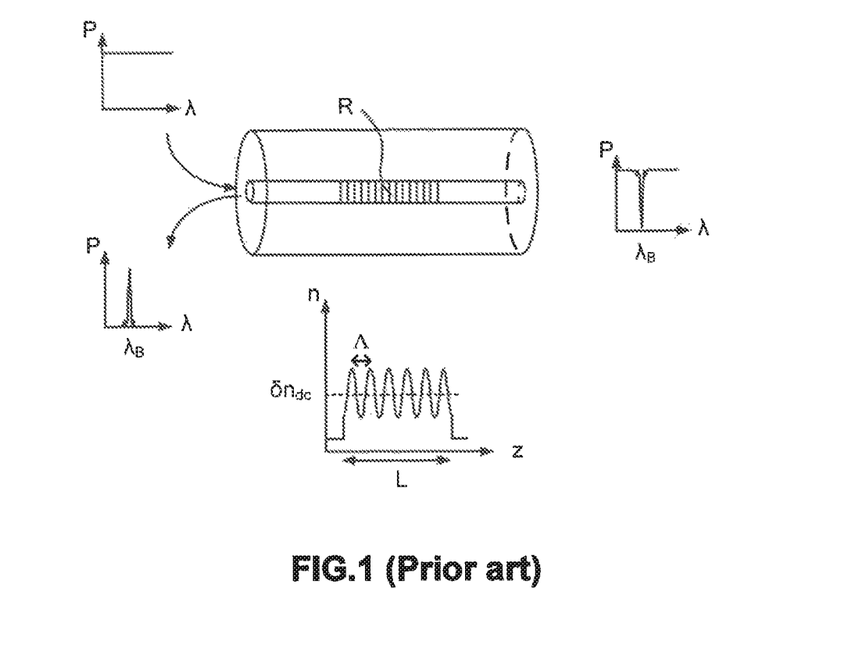
FIG. 1 diagrammatically shows a curvature sensor from prior art.

A Bragg grating sensor is shown in FIG. 1. The Bragg grating R is inscribed in the core of the optical fiber. The Bragg grating reflects a specific frequency, called Bragg wavelength $\lambda_B$, and transmits all of the other frequencies.

This Bragg wavelength $\lambda_B$ is proportional to the pitch of the grating ($\Lambda$) and to the effective index of the core of the fiber ($n_{eff}$):

$$\lambda_B = 2 \cdot n_{eff} \cdot \Lambda \quad (1)$$

Any modification of one of these parameters proportionately displaces the Bragg wavelength.

Given that the Bragg wavelength depends on the pitch of the grating ($\Lambda$), fiber index gratings can therefore be manufactured to reflect different Bragg wavelengths.

The variations in the stress applied to the fiber and the variations in the temperature of the fiber affect both the effective refractive index $n_{eff}$ and the pitch $\Lambda$ of the fiber index grating, which results in a shift $\Delta\lambda$ of the reflected wavelength. The term stress means any type of force applied to the optical fiber, such as a force of torsion, compression, tension or curvature.

The shift in the wavelength $\Delta\lambda$ of the light reflected with respect to the Bragg wavelength $\lambda_B$ therefore depends on the curvature of the optical fiber but also on the temperature of the fiber and on the other stresses applied to the optical fiber. This shift in the wavelength therefore does not supply a direct measurement of the radius of curvature of the optical fiber.

SUMMARY

An object of embodiments of the invention is to overcome all or a portion of the disadvantages of the aforementioned prior art.

More particularly, an object of embodiments of the invention is to propose an optical fiber curvature sensor that uses the technique of fiber index gratings but which makes it possible to directly determine the radius of curvature from wavelengths.

Another object of embodiments of the invention is to propose a curvature sensor that is simple to produce and which is of small size.

To this effect, embodiments of the invention propose a curvature sensor comprising at least one optical fiber comprising a core and at least one first sheath surrounding the core, the core and the at least one first sheath having different refractive indexes, the at least one optical fiber further comprising an end for receiving polychromatic light, a first grating with periodic longitudinal modulation of the refractive index of the optical fiber core, called first grating, inscribed in the core of the at least one optical fiber and configured to reflect a wavelength $\lambda_1$ of the light, the wavelength $\lambda_1$ being shifted by a quantity $\Delta\lambda_{B1}$ with respect to a reference wavelength $\lambda_B$ and the quantity $\Delta\lambda_{B1}$ being sensitive to the temperature, to deformations and to the curvature of the optical fiber, a second grating with periodic longitudinal modulation of the refractive index of the optical fiber core, called second grating, inscribed in the core of the at least one optical fiber and configured to reflect a wavelength $\lambda_2$ of the light, the wavelength $\lambda_2$ being shifted by a quantity $\Delta\lambda_{B2}$ with respect to the reference wavelength $\lambda_B$ and the quantity $\Delta\lambda_{B2}$ being sensitive to the temperature, to deformations and to the curvature of the optical fiber, the first and second gratings being defined so that the quantities $\Delta\lambda_{B1}$ and $\Delta\lambda_{B2}$ have substantially identical sensitivities to temperature and to deformations and substantially opposite sensitivities to curvature.

According to embodiments of the invention, we have: $\alpha_{T1} = \alpha_{T2}$, $\alpha_{\varepsilon1} = \alpha_{\varepsilon2}$ and $f_2(R) = -f_1(R)$ if $\alpha_{T1}$ and $\alpha_{T2}$ designate respectively the sensitivity of the first grating to the temperature and the sensitivity of the second grating to the temperature, $\alpha_{\varepsilon1}$ and $\alpha_{\varepsilon2}$ designate respectively the sensitivity to deformation of the first grating and the sensitivity to deformation of the second grating and f1(R) and f2(R) designate respectively the shift in the wavelength due to the curvature in the first grating and the shift in the wavelength due to the curvature in the second grating.

The sensor of the invention therefore delivers reflected wavelengths $\lambda_1 = \lambda_B + \Delta\lambda_{B1}$ and $\lambda_2 = \lambda_B + \Delta\lambda_{B2}$. The two gratings reflecting these wavelengths having identical behaviors with respect to the temperature and to deformations but opposite with respect to the curvature, when these two wavelengths are subtracted, the difference $\Delta\lambda = \lambda_1 - \lambda_2 = \Delta\lambda_{B1} - \Delta\lambda_{B2}$ depends solely on the curvature of the fiber. The curvature of the gratings can as such be deduced directly from the difference $\Delta\lambda$.

According to a particular embodiment, the sensor comprises a single optical fiber and the first and second gratings are Bragg gratings inscribed one behind the other in the core of the optical fiber, said first and second gratings having different average effective indexes.

According to another particular embodiment, the sensor comprises a single optical fiber and the first and second gratings are inscribed one on top of the other, the first grating being a Bragg grating and the second grating being a long period grating. In this embodiment, the optical fiber comprises advantageously a second sheath surrounding the first sheath, the second sheath having a refractive index less than the refractive index of the first sheath.

According to another embodiment, the sensor comprises a single optical fiber and a plurality of Bragg gratings inscribed one behind the other in the core of the optical fiber, the plurality of Bragg gratings being arranged in such a way as to behave as the association of a Bragg grating and a long period grating. More particularly, the sensor comprises a superstructured Bragg grating, commonly referred to as SFBG (Superstructured Fiber Bragg Grating). To carry out this superstructured grating, a hundred or so very short Bragg gratings in series are inscribed in the core of the fiber. All of the Bragg gratings are identical (same pitch, same length, same index modulation), The gratings are regularly spaced by a distance $L_{LPG}$. Their length $L_{FBG}$ is a fraction of $L_{LPG}$. The total length of the structure is about a centimeter, as with a conventional grating. This structure behaves as the association of a Bragg grating with pitch $L_{FBG}$ and of a long period grating with pitch $L_{LPG}$.

According to another particular embodiment, the sensor comprises first and second optical fibers in a resin bar having an axis of symmetry, the first and second gratings being inscribed respectively in the first and second optical fibers. In this embodiment, the first and second gratings are advantageously inscribed at substantially identical positions along the axis of symmetry and the first and second optical fibers are placed at equal distances from the axis of symmetry.

In this embodiment with two optical fibers, the first and second gratings can be Bragg gratings. According to an alternative, the first and second gratings are long period gratings.

Embodiments of the invention also relate to a device for measuring the curvature of a longitudinal element, characterized in that it comprises:
- a curvature sensor such as defined hereinabove, the at least one optical fiber of the curvature sensor being arranged along the element,
- a source of polychromatic light for emitting light through the at least one optical fiber, and
- a circuit for receiving the wavelengths $\lambda_1 = \lambda_B + \Delta\lambda_{B1}$ and $\lambda_2 = \lambda_B + \Delta\lambda_{B2}$ and determining the curvature of the element from the wavelengths.

This device makes it possible to deliver in a simple manner a value of the curvature of the longitudinal element.

Other advantages can further appear to those skilled in the art when reading the examples hereinbelow, shown in the accompanying figures, given for the purposes of information.

DETAILED DESCRIPTION

Embodiments of the invention are based on the fact that the variation in the resonant length (or Bragg wavelength $\lambda_B$) of an index grating such as a Bragg grating or a long period grating is governed by the average effective index $n_{eff}$ of the grating.

Figure 2:
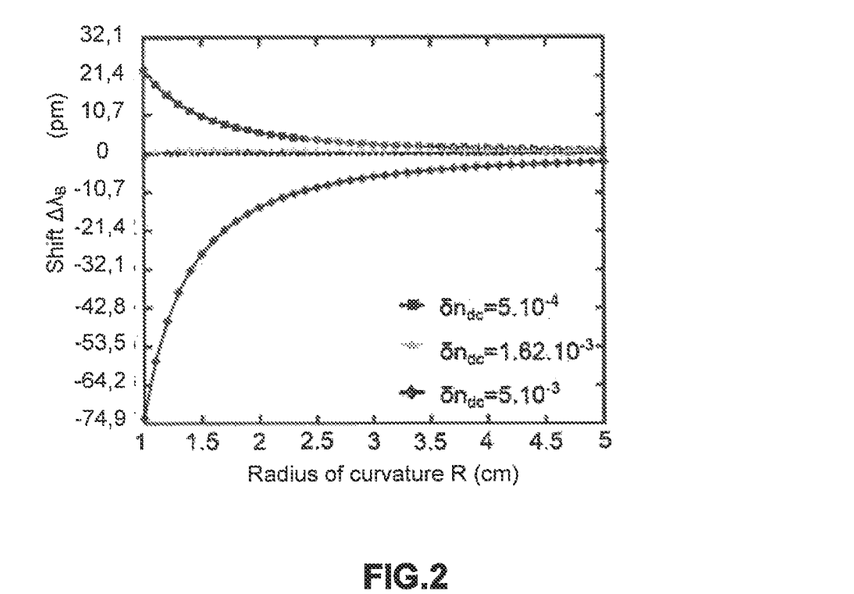
FIG. 2 is a diagram showing the change in the shift of the Bragg length $\Delta\lambda_B$ according to the radius of curvature R for three average grating effective index values $\delta n_{dc}$.

When such a grating is curved, the resonance wavelength is shifted. The shift is given by:

$$\Delta\lambda_B = 2 \cdot (\Delta n_{eff} + \delta n_{dc} \cdot \Delta\kappa_{eff}) \cdot \Lambda \quad (2)$$

where $\Lambda$ is the pitch of the grating, $\Delta n_{eff}$ is the variation in the effective index $n_{eff}$ of the core of the fiber due to the curvature, $\delta n_{dc}$ is the average effective index of the grating and $\Delta\kappa_{eff}$ is the variation in the coupling coefficient $\kappa_{eff}$ of the grating due to the curvature. These two factors depend only on the optical fiber and change in opposite directions: $n_{eff}$ increases when the radius of curvature decreases while $\kappa_{eff}$ decreases when the radius of curvature decreases. It can be seen in the relationship (2) that the variation in the coupling coefficient $\Delta\kappa_{eff}$ is multiplied by the average effective index $\delta n_{dc}$. Therefore, according to this parameter, the variation in the coupling coefficient $\Delta\kappa_{eff}$ can either be negligible compared to the variation in the effective index $\Delta n_{eff}$, or offset it or be much greater than the latter. It can be deduced from the above that the variation in the resonance wavelength $\Delta\lambda_B$ can be either negative, or zero or positive, such as is shown in FIG. 2 for a Bragg grating. By varying the average effective index $\delta n_{dc}$ of the grating, it is possible to set the shift in the wavelength $\Delta\lambda_B$ to a negative, zero or positive value for a given radius of curvature R.

In the example of FIG. 2, a shift $\Delta\lambda_B$ is obtained according to the radius of curvature R which is:
- positive for $\delta n_{dc} = 5 \cdot 10^{-4}$;
- zero for $\delta n_{dc} = 1.62 \cdot 10^{-3}$;
- negative for $\delta n_{dc} = 5 \cdot 10^{-3}$.

The idea of embodiments of the invention is therefore to associate two index gratings having the same sensitivity to deformation and to the temperature hut opposite sensitivities according to the curvature.

According to embodiments of the invention, the sensor proposed therefore comprises two fiber index gratings having the same sensitivity to the temperature and to deformations but opposite responses according to the radius of curvature. A block diagram of this sensor is shown in FIG. 3.

Figure 3:
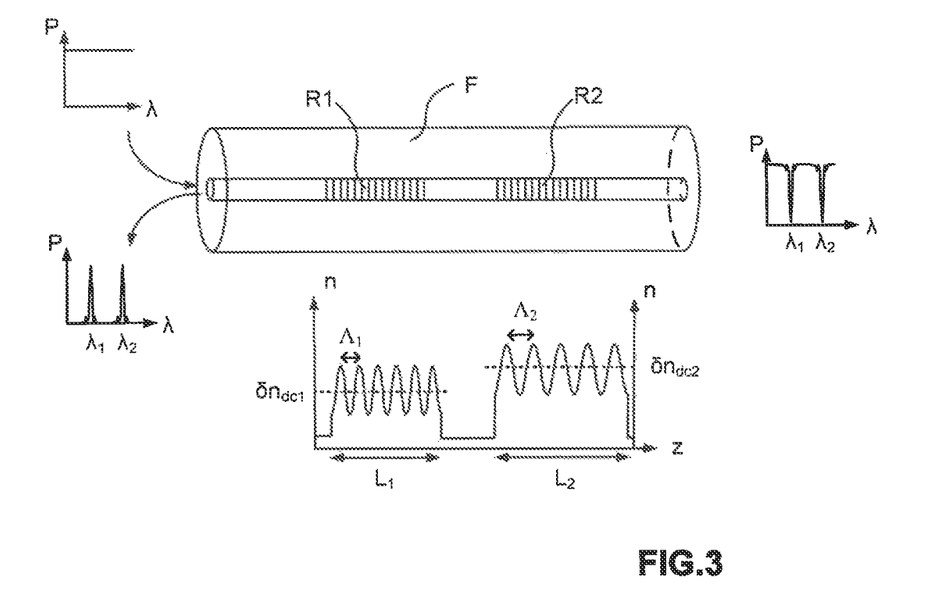
FIG. 3 diagrammatically shows a curvature sensor in accordance with an embodiment of the invention.

In reference to FIG. 3, the sensor comprises two Bragg gratings R1 and R2 arranged in series on an optical fiber F. The two gratings are photo-inscribed in the core of the optical fiber. As these two gratings are made from the same material, they have the same sensitivity to the temperature. The two gratings R1 and R2 are also designed in such a way as to have the same sensitivity to deformations (torsion, compression, tension or elongation) and opposite responses to the curvature.

As such, subjected to the same conditions of temperature, of deformation and of curvature, the two sensors R1 and R2 react in the following way:

$$\begin{cases} \Delta\lambda_{B1} = \alpha_T T + \alpha_\varepsilon \varepsilon + f(R) \\ \Delta\lambda_{B2} = \alpha_T T + \alpha_\varepsilon \varepsilon - f(R) \end{cases} \quad (3)$$

where $\Delta\lambda_{B1}$ is the variation in the wavelength of the grating R1, $\Delta\lambda_{B1}$ is the variation in the wavelength of the grating R2, T is the temperature of the optical fiber, $\alpha_T$ is the sensitivity of the grating to the temperature, $\varepsilon$ represents the deformation of the fiber, $\alpha_\varepsilon$ is the sensitivity to deformation, $+f(R)$ designates the shift in the wavelength due to the curvature in the grating R1 and $-f(R)$ designates the shift in the wavelength due to the curvature in the grating R2.

When the sensor is subjected to a polychromatic light, the grating R1 reflects a light that has a wavelength $\lambda_1 = \lambda_2 + \Delta\lambda_{B1}$ and the grating R2 reflects a light that has a wavelength $\lambda_2 = \lambda_B + \Delta\lambda_{B2}$.

If the reflected wavelengths $\lambda_1$ and $\lambda_2$ are subtracted, we obtain a magnitude $\Delta\lambda$ that is independent of the temperature and of the deformations and which depends only on the radius of curvature R:

$$\Delta\lambda = \lambda_1 - \lambda_2 = \lambda_B + \Delta\lambda_{B1} - \lambda_B - \Delta_{B2} = \Delta\lambda_{B1} - \Delta\lambda_{B2} = f(R).$$

It is therefore possible to directly obtain the radius of curvature R from the shift in the wavelength $\Delta\lambda$.

Figure 4:
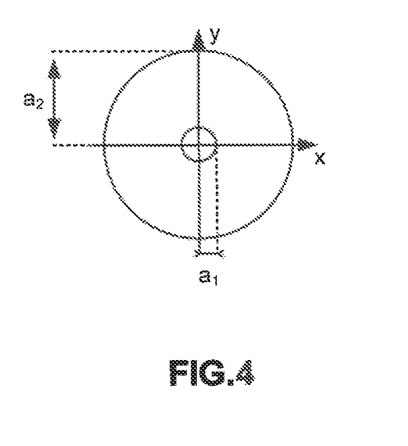
FIG. 4 shows a cross-section view of an optical fiber of the curvature sensor of an embodiment of the invention.
Figure 5:
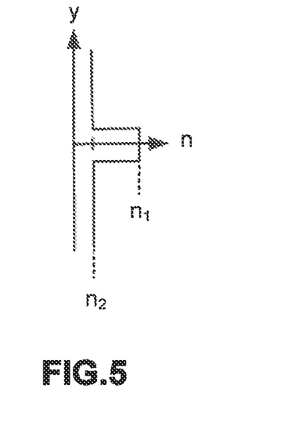
FIG. 5 shows the refractive index profile of the optical fiber of FIG. 4.

The optical fiber F is a single-mode and step-index fiber that has the following characteristics:
 radius of the core: $a_1 = 4.2$ μm;
 index of the core of the fiber: $n_1$;
 outer radius of the sheath: $a_2 = 62.5$ μm;
 index of the core of the fiber: $n_2$.

The dimensions and the index profile of the optical fiber can be seen in FIGS. 4 and 5.

The index of the sheath $n_2$ is evaluated from the Sellmeier relationship applied to the silica:

$$n^2(\lambda) = A + \frac{B}{1-\frac{C}{\lambda^2}} + \frac{D}{1-\frac{E}{\lambda^2}} \quad (4)$$

where A, B, C, D and E are the Sellmeier coefficients that depend on the temperature via the relationship X=aT+b, with T the temperature expressed in degrees centigrade.

The coefficients a and b of Sellmeier A, B, C, D and E of the silica are expressed in the following table:

| Coefficient X = aT + b | a | b |
|---|---|---|
| A | $6.90754 \cdot 10^{-6}$ | 1.31552 |
| B | $2.35835 \cdot 10^{-5}$ | 0.788404 |
| C | $5.84758 \cdot 10^{-7}$ | $1.10199 \cdot 10^{-2}$ |
| D | $5.48368 \cdot 10^{-7}$ | 0.91316 |
| E | 100 | 0 |

The index of the core $n_1$ is deduced from the index of the sheath $n_2$ by the relationship: $n_1 = 1.0036\ n_2$.

The grating R1 has a length L1=8.9 mm, a grating pitch $\Lambda_1 = 541.1$ nm and an average effective index $\delta n_{dc1} = 1 \cdot 10^{-4} \cdot n_1$. The grating R2 has a length L2=250 μm (micrometers), a grating pitch $\Lambda_2 = 541.4$ nm and an average effective index $\delta n_{dc2} = 3.5 \cdot 10^{-3} \cdot n_1$.

The wavelengths $\lambda_1$ and $\lambda_2$ reflected respectively by the gratings R1 and R2 (at rest) are then:

$\lambda_1 = 1565.2$ nm and $\lambda_2 = 1570$ nm.

These resonant wavelengths are sufficiently spaced to prevent any superposition of the resonances or inversion in their position in the curvature range $1/R \in [0;\ 1]$ cm$^{-1}$.

Figure 6:
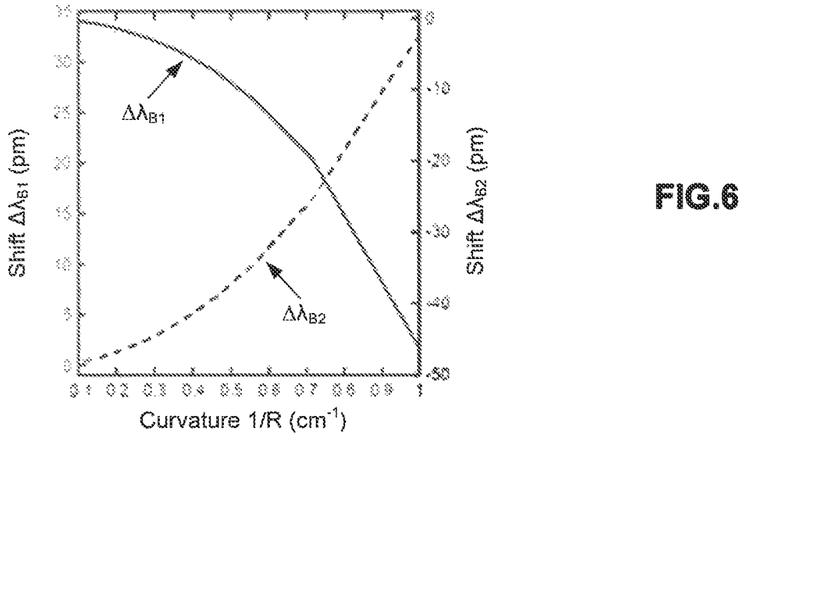
FIG. 6 is a diagram showing the change in the shifts $\Delta\lambda_{B1}$ and $\Delta\lambda_{B2}$ of the Bragg lengths of the two gratings of the curvature sensor of FIG. 3 according to the curvature 1/R.

As can be seen in FIG. 6, the shift in the wavelength $\Delta\lambda_{B1}$ of the grating R1 decreases with the curvature of the fiber while the shift in the wavelength $\Delta\lambda_{B2}$ of the grating R2 follows an opposite curve.

The sensitivity to axial deformation ($\alpha_\varepsilon$) of the grating R1 is identical to that of the grating R2 and is evaluated at 1.23 pm/με (where 1 με corresponds to a deformation of $10^{-6}$ m/m). Likewise, the sensitivities to the temperature ($\alpha_T$) of the two gratings R1 and R2 are substantially identical, of about 12.02 pm/° C.$^{cent}$.

Figure 7:
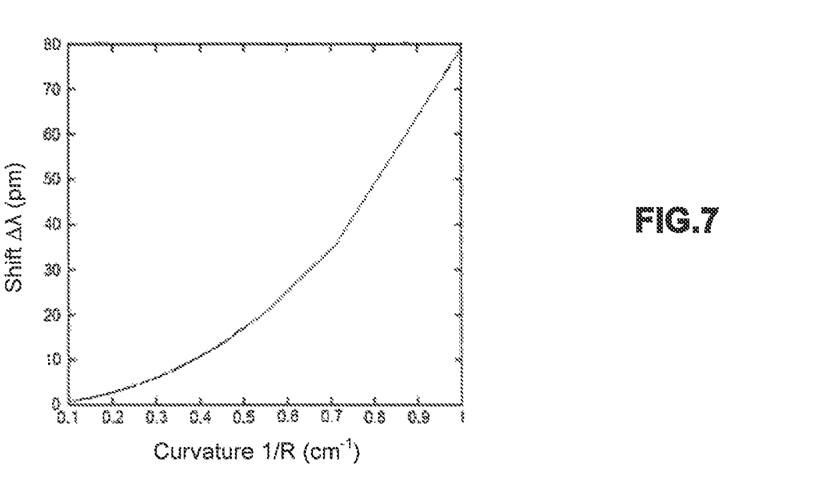
FIG. 7 is a diagram showing the change in the shift $\Delta\lambda = \Delta\lambda_{B1} - \Delta\lambda_{B2}$ according to the curvature 1/R.

This results in that the subtraction of the two signals of wavelength $\lambda_1$ and $\lambda_2$, i.e. $\Delta\lambda = \lambda_1 - \lambda_2 = \Delta\lambda_{B1} - \Delta\lambda_{B2}$, is independent of the temperature T and of the deformations $\varepsilon$ and depends solely on the curvature of the optical fiber. The curve of FIG. 7 shows the dependency between shift in the wavelength $\Delta\lambda$ and the curvature of the sensor of FIG. 3, The dependency is non-linear. Simply measuring the shift $\Delta\lambda$ makes it possible to obtain the radius of curvature from this curve.

In the embodiment shown hereinabove, the gratings R1 and R2 are Bragg gratings inscribed one behind the other in the optical fiber F. As indicated hereinabove, these two gratings differ only by their average effective indexes ($\delta n_{dc1}$ and $\delta n_{dc2}$), their pitches ($\Lambda_1$ and $\Lambda_2$) and their lengths ($L_1$ and $L_2$) in such a way that their dependencies on the curvature are opposite.

According to an alternative embodiment, the gratings R1 and R2 are respectively a Bragg grating and a long period grating inscribed in the core of the optical fiber F one on top of the other. The optical fiber F comprises advantageously two sheaths. The second sheath is used to insulate the light that propagates in the first sheath of the outer medium. Its refractive index is less than that of the first sheath. The two gratings advantageously have the same length. The long period grating is designed in such a way as to have only a resonance in the measured spectral range. Moreover, the resonant mode is chosen so as to have the same sensitivity to deformation as the Bragg grating. The average effective indexes of the two gratings are such that the responses of the two gratings to the curvatures are opposite.

According to another embodiment, the sensor comprises a single optical fiber and a plurality of Bragg gratings inscribed one behind the other in the core of the optical fiber, the plurality of Bragg gratings being arranged in such a way as to behave as the association of a Bragg grating and a long period grating.

More particularly, the sensor comprises a superstructured Bragg grating, commonly referred to as SFBG for Superstructured Fiber Bragg Grating. In order to produce this superstructured grating, a hundred or so very short Bragg gratings in series are inscribed in the core of the fiber. All of the Bragg gratings are identical (same pitch, same length, same index modulation). The gratings are regularly spaced by a distance $L_{LPG}$. Their length $L_{FBG}$ is a fraction of $L_{LPG}$. The total length of the structure is about one centimeter, as with a conventional grating. This structure behaves as the association of a Bragg grating with a pitch $L_{FBG}$ and of a long period grating with a pitch $L_{LPG}$.

According to another alternative embodiment, the sensor comprises two optical fibers arranged in a resin bar having an axis of symmetry. The two fibers are advantageously placed at equal distances from the axis of symmetry of the bar. The grating R1 is inscribed in the first fiber and the second grating is inscribed in the second fiber. They are advantageously inscribed at substantially identical positions along the axis of symmetry. In this embodiment, the gratings R1 and R2 can be Bragg gratings or long period gratings. In this latter case, the optical fibers advantageously comprise two sheaths. As with the other embodiments, the average effective indexes of the two gratings are selected so that the responses of the two gratings to the curvatures are opposite.

As explained hereinabove, the wavelengths $\lambda_1$ and $\lambda_2$ coming from the sensor make it possible to determine the radius of curvature. These two wavelengths must therefore be received and processed in order to obtain the radius of curvature. The invention therefore relates to, more globally, a device for measuring the curvature of a longitudinal element comprising:

a curvature sensor according to one of the embodiments described hereinabove, with the optical fiber of the curvature sensor being arranged along the element of which the radius of curvature is to be measured, a source of polychromatic light in order to emit light through the optical fiber of the sensor, and a circuit for receiving the wavelengths $\lambda_1 = \lambda_B + \Delta\lambda_{B1}$ and $\lambda_2 = \lambda_B + \Delta\lambda_{B2}$ coming from the curvature sensor and determining the curvature of the element from said wavelengths.

Figure 8:
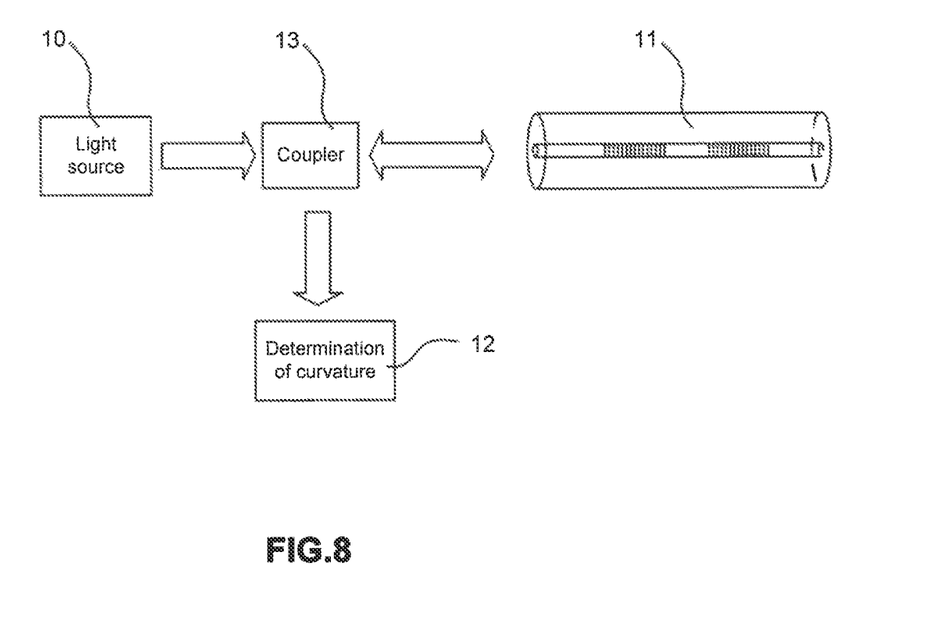
FIG. 8 diagrammatically shows a device for measuring the curvature comprising the sensor of FIG. 3.

Such a device is shown diagrammatically in FIG. 8. It comprises a source of white or polychromatic light 10, a curvature sensor 11 such as defined hereinabove for receiving the light emitted by the source 10 and delivering wavelengths $\lambda_1$ and $\lambda_2$ corresponding to the wavelengths reflected by the gratings R1 and R2 of the sensor, a circuit 12 for determining the radius of curvature R of the element from the wavelengths $\lambda_1$ and $\lambda_2$. A coupler 13 is used for the transmission of the polychromatic light from the source 10 to the sensor 11 and the transmission of the wavelengths $\lambda_1$ and $\lambda_2$ from the sensor 11 to the circuit 12. The circuit is for example an interferometer equipped with means for processing in order to perform the subtraction $\Delta\lambda = \lambda_1 - \lambda_2$ and to deduce therefrom, for example by means of a look-up table, the radius of curvature R of the element.

Of course, it is possible to arrange several curvature sensors in accordance with embodiments of the invention along the element, with offset resonant wavelengths, in order to measure the curvature at several points of the latter.

The sensor and the device presented here have many advantages:
easy to manufacture;
easy to implement,
reduced size of the sensor;
obtaining of the radius of curvature directly from a difference in wavelength;
insensitivity to the drops in intensity of the light emitted or reflected.

Moreover, as the measurement proposed is independent of the temperature and of the deformation, the invention can be used in many fields, in particular in applications where the sensor can be subjected to temperature gradients, for example in maritime or medical applications.

Embodiments of the invention are described in the above by way of example. It is understood that those skilled in the art are able to produce various alternative embodiments of the invention, by associating for example the various characteristics hereinabove taken alone or in combination, without however leaving the scope of the invention.

The invention claimed is:

1. Curvature sensor comprising:
    at least one optical fiber (F) comprising a core and at least one first sheath surrounding said core, said core and said at least one first sheath having different refractive indexes, said at least one optical fiber further comprising an end for receiving polychromatic light,
    a first grating for periodic longitudinal modulation of the refractive index of the optical fiber core, called first grating (R1), inscribed in the core of said at least one optical fiber and configured to reflect a wavelength $\lambda_1$ of the light, said wavelength $\lambda_1$ being shifted by a quantity $\Delta\lambda_{B1}$ with respect to a reference wavelength $\lambda_B$ and said quantity $\Delta\lambda_{B1}$ being sensitive to the temperature, to deformations and to the curvature of the optical fiber,
    at least one second grating for periodic longitudinal modulation of the refractive index of the optical fiber core, called second grating (R2), inscribed in the core of said at least one optical fiber and configured to reflect a wavelength $\lambda_2$ of the light, said wavelength $\lambda_2$ being shifted by a quantity $\Delta\lambda_{B2}$ with respect to said reference wavelength $\lambda_B$ and said quantity $\Delta\lambda_{B2}$ being sensitive to the temperature, to deformations and to the curvature of the optical fiber,
    wherein the average effective indexes, pitches and lengths of first and second gratings are configured such that the quantities $\Delta\lambda_{B1}$ and $\Delta\lambda_{B2}$ have substantially identical sensitivities to temperature and to deformations and substantially opposite sensitivities to curvature and such that the difference between $\lambda_1$ and $\lambda_2$ is substantially independent of the temperature and deformations and depends on a radius of the curvature of the optical fiber.

2. Sensor according to claim 1, further comprising a single optical fiber, the first and second gratings (R1, R2) being Bragg gratings inscribed one behind the other in the core of the optical fiber, said first and second gratings having different average effective indexes ($\delta n_{dc1}, \delta n_{dc2}$).

3. Sensor according to claim 1, further comprising a single optical fiber and in that the first and second gratings (R1, R2) are inscribed one on top of the other, the first grating being a Bragg grating and the second grating being a long period grating, said first and second gratings having different average effective indexes ($\delta n_{dc1}, \delta n_{dc2}$).

4. Sensor according to claim 3, wherein the optical fiber comprises a second sheath surrounding said first sheath, said second sheath having a refractive index less than the refractive index of the first sheath.

5. Sensor according to claim 1, comprising a single optical fiber and a plurality of Bragg gratings inscribed one behind the other in the core of the optical fiber, said plurality of Bragg gratings being arranged in such a way as to behave as the association of a Bragg grating and a long period grating.

6. Sensor according to claim 1, comprising first and second optical fibers in a resin bar having an axis of symmetry, the first and second gratings being inscribed respectively in said first and second optical fibers.

7. Sensor according to claim 6, wherein the first and second gratings (R1, R2) are arranged at substantially identical positions along said axis of symmetry and said first and second optical fibers are placed at equal distances from said axis of symmetry.

8. Sensor according to claim 6, wherein said first and second gratings (R1, R2) are Bragg gratings.

9. Sensor according to claim 6 or, wherein said first and second gratings (R1, R2) are long period gratings.

10. Device for measuring the curvature of a longitudinal element, comprising:
- a curvature sensor according to claim 1, said at least one optical fiber of the curvature sensor being arranged along said element,
- a source of polychromatic light for emitting light through said at least one optical fiber, and
- a circuit (12) for receiving the wavelengths $\lambda_1=\lambda_B+\Delta\lambda_{B1}$ and $\lambda_2=\lambda_B+\Delta\lambda_{B2}$ and determining the curvature of said element from the difference between $\lambda_1=\lambda_B+\Delta\lambda_{B1}$ and $\lambda_2=\Delta_B+\Delta\lambda_{B2}$.

* * * * *